United States Patent
Kellner et al.

(10) Patent No.: US 12,548,832 B2
(45) Date of Patent: Feb. 10, 2026

(54) BATTERY SYSTEM FOR AN ELECTRONICALLY OR SEMI-ELECTRICALLY DRIVEN VEHICLE

(71) Applicant: Dr. Ing. h.c. F. Porsche Aktiengesellschaft, Stuttgart (DE)

(72) Inventors: Philipp Kellner, Renningen (DE); Christopher Volkmer, Niefern-Öschelbronn (DE); Benjamin Passenberg, Rutesheim (DE)

(73) Assignee: Dr. Ing. h.c. F. Porsche Aktiengesellschaft (DE)

( * ) Notice: Subject to any disclaimer, the term of this patent is extended or adjusted under 35 U.S.C. 154(b) by 519 days.

(21) Appl. No.: 18/096,078

(22) Filed: Jan. 12, 2023

(65) Prior Publication Data
US 2023/0223629 A1 Jul. 13, 2023

(30) Foreign Application Priority Data
Jan. 13, 2022 (DE) ............ 10 2022 100 745.6

(51) Int. Cl.
*H01M 50/204* (2021.01)
*B60L 50/64* (2019.01)
(Continued)

(52) U.S. Cl.
CPC ......... *H01M 50/204* (2021.01); *B60L 50/64* (2019.02); *H01M 10/6554* (2015.04); *H01M 50/507* (2021.01)

(58) Field of Classification Search
None
See application file for complete search history.

(56) References Cited

U.S. PATENT DOCUMENTS 10,211,434 B2  2/2019  Ichikawa et al.
2011/0287285 A1* 11/2011 Yoon ................ B60L 1/003
                                              429/9
(Continued)

FOREIGN PATENT DOCUMENTS

CH         702863 A1      9/2011
DE    102017214303 A1     2/2019
(Continued)

OTHER PUBLICATIONS

Machine translation of JP2018-073551, published on May 10, 2018 (Year: 2018).*

(Continued)

*Primary Examiner* — Anca Eoff
(74) *Attorney, Agent, or Firm* — Buchanan Ingersoll & Rooney PC

(57) ABSTRACT

A battery system for an electrically or semi-electrically driven vehicle, in particular for a passenger car. The battery system includes at least two battery modules, each having a module housing and a plurality of battery cells arranged in the module housing. The battery system includes a cooling system for cooling the battery cells. The battery system includes a busbar, wherein the at least two battery modules are connected to one another by the busbar. The battery system includes a busbar housing configured outside of the module housing, wherein the busbar is arranged in the busbar housing and is thermally coupled to the busbar housing. The busbar housing is thermally coupled, at least in portions, to at least one of the battery modules, preferably to the module housing of the at least one battery module.

19 Claims, 5 Drawing Sheets

(51) Int. Cl.
*H01M 10/6554* (2014.01)
*H01M 50/507* (2021.01)

(56) References Cited

U.S. PATENT DOCUMENTS

| | | | | |
|---|---|---|---|---|
| 2018/0026256 A1* | 1/2018 | Inoue | ............ | H01M 50/581 |
| | | | | 429/61 |
| 2018/0034014 A1* | 2/2018 | Ichikawa | ............ | H01M 50/30 |

FOREIGN PATENT DOCUMENTS

| DE | 102017129249 | A1 | | 6/2019 |
|---|---|---|---|---|
| DE | 102021112772 | B3 | | 6/2022 |
| JP | 08-9534 | | * | 1/1996 |
| JP | 2018018795 | A | | 2/2018 |
| JP | 2018073551 | A | * | 5/2018 |

OTHER PUBLICATIONS

Machine translation of JP08-9534, published on Jan. 12, 1996 (Year: 1996).*

Japanese Notice of Reasons for Refusal for Japanese Application No. 2023-001438, dated Feb. 21, 2024, 4 pages.

\* cited by examiner

BATTERY SYSTEM FOR AN ELECTRONICALLY OR SEMI-ELECTRICALLY DRIVEN VEHICLE

CROSS-REFERENCE TO RELATED APPLICATION

This application claims priority to German Patent Application No. 10 2022 100 745.6, filed Jan. 13, 2022, the content of such application being incorporated by reference herein in its entirety.

FIELD OF THE INVENTION

The present invention relates to a battery system for an electrically or semi-electrically driven vehicle, in particular for a passenger car. Battery systems as known in the prior art generally comprise a plurality of battery modules, wherein a plurality of battery cells, in particular in the form of battery cell packs, also referred to as cell stacks, are arranged in the respective battery module. The battery modules are typically interconnected by means of a busbar.

BACKGROUND OF THE INVENTION

While many battery cells in electric vehicles are cooled, the busbars are generally not cooled. With high charging and discharging currents, however, it is advantageous to also cool the busbars, because the busbars heat up, especially during rapid charging, and are directly connected to the battery cells, whereby heat is input from the busbars into the battery cells. Such a heat input is undesirable and can lead to faster aging of the battery cells, which are stressed by the heat input. Furthermore, the busbars also may not exceed a maximum temperature, so that the electrical insulation, which typically encloses such busbars, is not damaged, for example by melting.

Typically, in operation, the battery cells are cooled to a temperature below 60° C. and are typically held in the range of 20° C. to 30° C. The busbars, on the other hand, typically have higher operating temperatures and can certainly have temperatures of up to 150° C. Typically, the operating temperature of the busbars is limited by the material of electrical insulation of the busbars. Typically, busbars are operated in a temperature range below 120° C. but well above a temperature of the battery cells.

A direct cooling of the busbars with the battery cell cooling typically provided has the disadvantage that the busbars are cooled more than necessary, because such a cooling system is designed to cool the battery cells to a temperature of 20° C. to 40° C. The additional heat input into the battery cell cooling circuit would cause the battery cells to be more poorly cooled, or the power consumption of the cooling system for cooling the battery cells would have an unnecessarily high power consumption to cool the busbars. A separate cooling system for the busbars or the provision of separate cooling components for the busbars that would be powered by the cooling system for the battery cells and would be designed so as to keep the busbars at a higher temperature level than that of cell cooling is expensive and costly to implement.

A busbar for a hybrid passenger vehicle is known from CH 702 863 A1, which is incorporated by reference herein, wherein this busbar can transmit currents in the range of 100 to 1,000 amperes, wherein this busbar comprises an apparatus for cooling the busbar by means of a housing, wherein the housing receives thermal energy from the busbar and delivers it to the environment.

A cooling apparatus for cooling a busbar is also known from DE 10 2017 129 249 A1, which is incorporated by reference herein, wherein the busbar is thermally coupled to an active cooling device.

SUMMARY OF THE INVENTION

The battery system according to aspects of the invention is a battery system for an electrically or semi-electrically driven vehicle, in particular for an electrically or semi-electrically driven passenger car. The battery system comprises at least two battery modules, each having a module housing and a plurality of battery cells arranged in the module housing. Preferably, the battery cells of the respective battery module are gathered into one or more battery cell packs. The battery cell packs are preferably cell stacks. The battery system comprises a cooling system for cooling the battery cells of the battery modules. The battery system comprises a busbar, wherein the at least two battery modules are interconnected by means of the busbar. The battery system comprises a busbar housing formed outside of the module housing, wherein the busbar is arranged in the busbar housing and thermally coupled to the busbar housing. Furthermore, the busbar housing is thermally coupled at least in portions to at least one of the battery modules.

By thermally coupling the busbars to the busbar housing and thermally coupling the busbar housing to the battery module, preferably the module housing of the battery module, the busbars are cooled via the cooling system for cooling the battery cells via a fairly long cooling path, thereby cooling the busbars inexpensively with low design space, low weight requirement, and simple design. Due to the fact that the cooling does not directly cool the busbars, but instead cooling occurs indirectly via the battery module, preferably the module housing, the busbar housing, and the thermal connection of the busbar housing to the busbars, the busbars are not cooled to the extent that the battery cells are cooled, thereby achieving a reasonable temperature level for the busbars with low heat input into the cooling system for cooling the battery cells. By changing the quality of the thermal coupling between the busbar housing and the battery module, e.g., the battery module housing, as well as the busbar housing and the busbars, an adjustment can be made to the effect that the busbars can be operated via the cooling system for cooling the battery cells in the preferred temperature range, which should or can generally lie significantly above the temperature range of the battery cells without this having a particularly negative effect on the efficiency or safety of the cooling of the battery cells. Preferably, the quality of the thermal coupling is such that, when the battery system is in operation, the cells operate in a temperature range of 20° C. to 60° C. and the busbars operate in a temperature range of over 60° C. to 150° C. An adjustment of the quality of the thermal coupling can be made by a corresponding choice of material of the components, for example by the material of the busbar housing. The quality of the thermal coupling can also be increased or decreased by enlarging or reducing the coupling surface areas.

The thermal coupling between the busbars and the battery module, preferably the module housing, can occur, for example, in that corresponding heat conducting elements, for example gap pads or gap fillers, are introduced into interstices between the elements to be coupled. By enlarging the interstices, the quality of the thermal coupling can be reduced and vice versa. Furthermore, the quality of the thermal coupling can be influenced by a corresponding choice of material of the heat conducting elements. It is also quite conceivable to alter or adjust the quality of the thermal coupling by decreasing or increasing contact regions between the busbar housing and the module housing. Also, contact surfaces between heat conducting elements and busbars or heat conducting elements and the busbar housing can be selected such that the desired quality of thermal coupling is produced.

In particular, it is provided that the busbar housing does not fully abut against the battery modules, preferably the module housings, but rather only partially abuts against the battery modules, preferably the module housing. Namely, it has been shown that even small contact surfaces are sufficient in order to achieve the desired cooling effect on the busbars. In this context, it is considered particularly advantageous when the respective module housing comprises a connecting portion projecting from the remaining module housing, wherein the busbar housing abuts the respective module housing only in the region of the connecting portion. These connecting portions can preferably also serve to secure the busbar housing to the respective battery module housing. In particular, it is provided that the respective connecting portion comprises a counter-structure for a connecting means connecting the busbar housing to the module housing. The counter-structure is preferably a thread, and the connecting means is preferably a screw. The connecting portions also have the advantage, in particular with regard to a fastening of the busbar housing, that the connecting portion has a greater thickness due to its projection compared to the remaining module housing, so that, in this region, a mechanical fastening of the busbars can occur smoothly and threads can also be introduced, in particular in these regions. Accordingly, the remaining battery module housing can be kept lower in terms of material thickness, which advantageously affects the weight and cost of manufacture.

Preferably, the busbar housing is mechanically and thermally connected to the module housings only in the region of the connecting portions.

Preferably, the connecting portion is annular and encloses a through-opening formed in the module housing. This through-opening serves in particular for electrically connecting the busbar to the battery cells. It is quite conceivable that the busbar is mechanically and electrically connected to an electrical contact that passes through the through-opening.

The connecting portion is preferably configured as a separate component, and the module housing is preferably configured as an extrusion profile. In a preferred embodiment, it is provided that the connecting portion is non-releasably connected to the module housing, for example welded thereto.

It is considered particularly advantageous when the busbar housing is thermally coupled to all battery modules, at least in portions.

Preferably, the busbar housing is configured as a train housing, which is rectilinear in this respect.

In a preferred embodiment, it is provided that a plurality of busbars, preferably all busbars, are arranged in the busbar housing. In this respect, only one busbar housing is required for a plurality of busbars, in particular only one busbar housing for the entire battery system.

With respect to a particularly simple assembly and production of the busbar housing, it is considered advantageous when the busbar housing comprises a lower shell and an upper shell that are releasably connected to one another, for example bolted to one another. In this context, it is considered particularly advantageous when the bottom shell of the busbar housing is used in order to secure the busbar housing to the module housing. Preferably, the lower shell is screwed to the module housings.

It is considered particularly advantageous when the lower shell and/or the upper shell have a U-shaped or substantially U-shaped cross-section. With regard to a sealing of the busbar housing, it is considered advantageous when sealing elements are arranged between the upper shell and the lower shell. The upper shell is preferably configured as a sheet metal bended part and the lower shell is preferably configured as a casted part. Because the upper shell can have a lower stability by contrast to the lower shell, it is sufficient to only form the lower shell as a casted part.

It is considered particularly advantageous when the respective busbar is thermally coupled to both the upper shell and the lower shell, for example by means of heat conducting elements arranged between the busbars and the respective shell.

In a particularly preferred embodiment, it is provided that the busbar housing is only thermally coupled in portions to the respective battery module, preferably the respective module housing, insofar as there is only a local thermal coupling between the busbar housing and the respective module housing. As already stated, this can occur via the projecting connecting portions.

It is considered particularly advantageous when the respective busbar is thermally coupled to the busbar housing over the entire longitudinal extension of the busbar, not only in portions. In this respect, it is considered particularly advantageous when the busbar is thermally coupled to the busbar housing over the entire or approximately entire length of the respective busbar housing, whereas the busbar housing is only thermally coupled in portions to the respective module housing via its longitudinal extension. As a result, a sufficiently strong and sufficiently homogeneous cooling of the busbars can be effected without unnecessarily straining the cooling system of the battery cells.

In a preferred embodiment, it is provided that the thermal coupling between the respective busbar and the busbar housing is effected via one or more deformable heat conducting elements arranged between the respective busbar. Manufacturing tolerances can be compensated for by the deformability of the heat conducting element. Preferably, the heat conducting element is elastically deformable. For example, the deformable heat conducting element can be formed by a gap pad or a gap filler. Preferably, the deformable heat conducting element has a thickness of 1.0 mm to 6 mm. Preferably, the heat conducting element is compressed in the installed state. This ensures a good thermal conduction and mechanical fixation of the busbars. In this respect, the use of deformable heat conducting elements also has the advantage that the thermal coupling between the busbars and the busbar housing is particularly stable, since the deformable heat conducting elements additionally hold the busbars at the desired position.

It is also quite conceivable that a deformable heat conducting element is arranged between these components for the purpose of thermal coupling between the module housing and the busbar housing. However, it is considered particularly advantageous when the busbar housing directly abuts the respective module housing, in particular the connecting portion. In this context, it is considered particularly advantageous when both the busbar housing and the module housing are made of a material with good thermal conductivity, for example a metal or a metal alloy.

It is considered particularly advantageous when the respective busbar is thermally coupled to the busbar housing on at least two sides of the busbar, preferably opposite sides of the busbar.

In a preferred embodiment, it is conceivable that the busbars in the busbar housing are mechanically held in one or more bearing structures, for example, held in a pre-secured state in bearing structures configured as retaining clips, wherein the bearing structures are thermally coupled to the busbar housing, for example, via a gap pad. The bearing structure, which can certainly be a pre-assembly bracket, is preferably made of a thermally conductive plastic and/or aluminum. The mounting of the battery system is facilitated by the bearing structures. In the region of the bearing structures, a thermal coupling can occur particularly simply locally. Preferably, the bearing structures are therefore located in regions of the portions of the busbar housing that are thermally coupled to the module housing.

It is quite conceivable that tolerance compensation elements are arranged between the busbars and the busbar housing, for example in the form of mechanical spring elements, in order to ensure a secure fixing of the position of the busbars in the busbar housing. Furthermore, the tolerance compensation elements ensure that the busbars are thermally coupled to the busbar housing in that the tolerance compensation elements press the busbars onto the busbar housing or onto a heat conducting element arranged between the busbar housing and the busbars. Such tolerance compensation elements are preferably mounted on a side of the busbars facing away from the module housing. The tolerance compensation element can also be a foam, for example.

In a particularly preferred embodiment, it is provided that the cooling system comprises a heat sink, in particular in the form of a heat sink plate, mounted on an outer side of the module housing facing away from the battery cells, wherein this heat sink is perfused by a coolant. For this purpose, the heat sink can comprise, for example, one or more coolant ducts. In this context, it is considered particularly advantageous when the busbar housing is thermally connected to the housing wall of the module housing comprising the heat sink. Preferably, the busbar housing is arranged on the outer wall such that there is no contact between the busbar housing and the heat sink. Accordingly, it is considered advantageous when the busbar housing and the heat sink are thermally coupled to one another merely indirectly via the housing wall of the module housing comprising the heat sink. Preferably, any connecting portion projects in the direction of the busbar housing opposite the heat sink, such that, when the busbar housing abuts the connecting portion, the busbar housing is spaced apart from the heat sink.

In a preferred embodiment, it is provided that the respective module housing comprises a terminal opening for establishing an electrical connection with the respective busbar, wherein a terminal element passes through the terminal opening, wherein the module housing comprises a sealing portion circumferentially enclosing the terminal opening, wherein the busbar housing sealingly cooperates with the circumferentially enclosing sealing portion. The sealing portion can certainly be part of the connecting portion.

In a particularly preferred embodiment, the connecting portion has three functions: It serves to mechanically connect the busbar housing to the module housing, to thermally connect portions of the busbar housing to the module housing, and to tightly seal the terminal opening.

It is considered particularly advantageous when the busbar comprises an electrical insulation, for example in the form of a coating or a plastic housing enclosing the current-conducting component of the busbar.

It is considered particularly advantageous when the busbar housing is electrically conductively connected to the respective module housing, thereby achieving additional electromagnetic shielding through the busbar housing and the module housing for bypass.

The solution according to aspect of the invention offers advantages in that a cooling for the busbars can be provided in a particularly simple manner by using the existing cooling system of the battery cells. This results in synergy effects, wherein, due to the quality of the thermal coupling, a sufficient cooling of the busbars can be achieved in a particularly simple manner without unnecessarily straining the cooling system of the battery cells. The cooling of the busbars can reduce thermal losses due to electrical resistance of the busbars by lowering the temperature of the busbars. This is relevant, in particular, for rapid charging.

Furthermore, due to the cooling of the busbars, the busbar transverse sections can be reduced. When the thermal coupling is designed accordingly, an improvement of the cell life can also be achieved by a more homogeneous temperature distribution within the cells.

BRIEF DESCRIPTION OF THE DRAWINGS

In the following figures, the invention is explained in further detail with reference to exemplary embodiments, without being limited thereto. The figures show.

DETAILED DESCRIPTION OF THE INVENTION

FIGS. 1 to 6 show embodiments of the battery system 1 according to aspects the invention, wherein the illustrations of FIGS. 1 to 6 are merely schematic representations. The illustrations are schematic and simplified so as to depict the essential components of the battery system 1.

The X-axis shown in the figures points in the longitudinal vehicle direction, namely in the direction of travel, the Y-axis corresponds to a transverse vehicle direction, and the Z-axis corresponds to a vertical vehicle direction.

Figure 1:
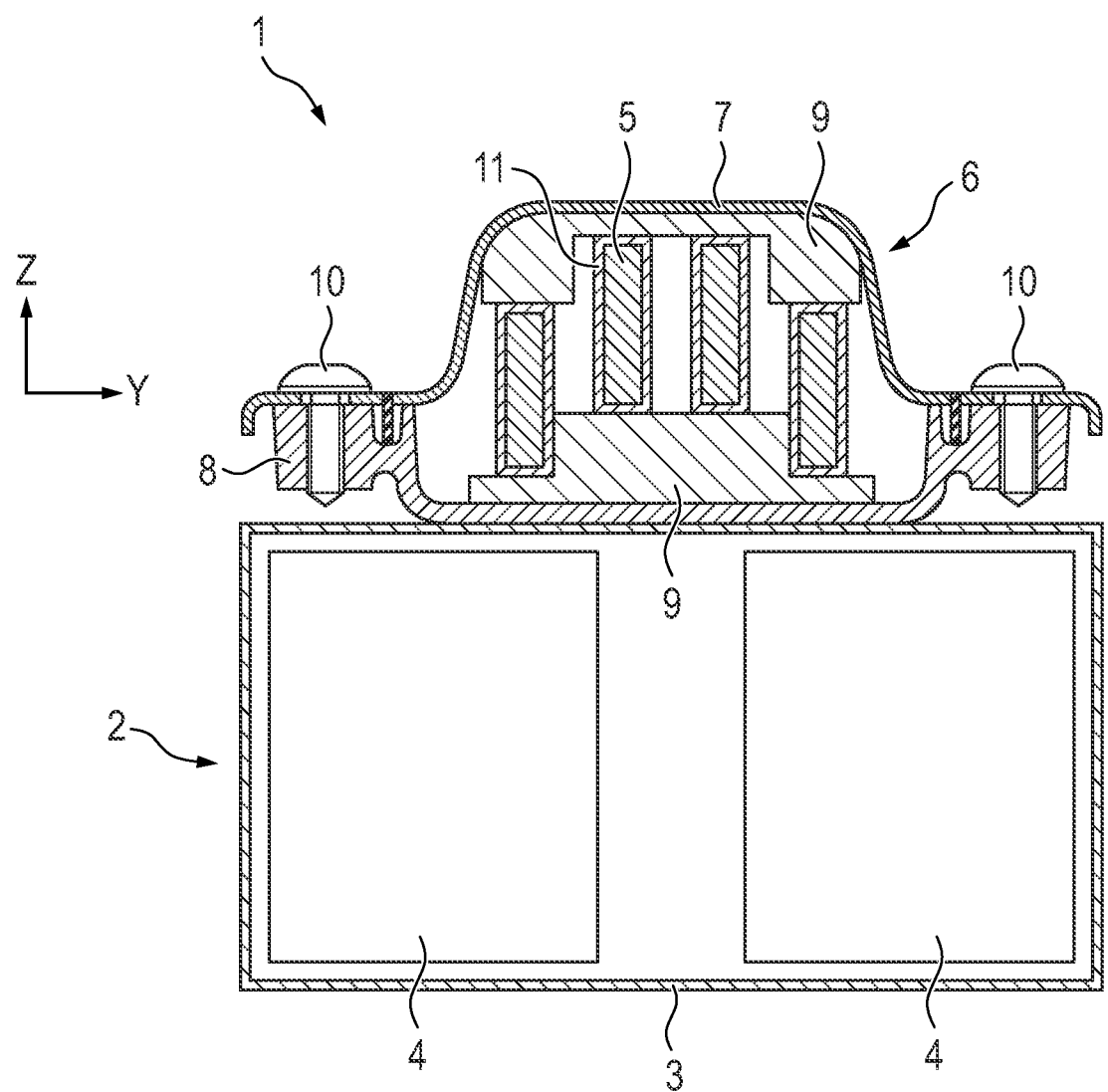
FIG. 1 depicts a first embodiment of the battery system in a sectional view.

FIG. 1 shows a battery system 1 for an electrically or semi-electrically driven vehicle, in the present case for a passenger vehicle, in a sectional view in a simplified illustration. The battery system 1 comprises a plurality of battery modules 2 arranged in succession in the longitudinal direction X. The respective battery module 2 comprises a rectangular module housing 3 in cross-section and a plurality of battery cells 4 arranged in the module housing 3. The battery cells 4 are gathered together in order to form battery cell stacks. The battery module 2 shown in FIG. 1 comprises two battery cell packs arranged adjacent one another in the transverse direction Y of the vehicle. The battery system 1 comprises a cooling system for cooling the battery cells 4. Such cooling systems are well known from the prior art, so that only the components of such a cooling system relevant to the present invention will be discussed in further detail below. The cooling system comprises a cooling circuit that is perfused by a coolant, wherein the coolant serves to take up heat from the battery cells 3 and dissipate the acquired heat to a heat sink of the cooling system. The battery cells 4 are thus cooled by means of the cooling system. Typically, in operation, the battery cells are cooled to a temperature below 60° C. and are typically held in the range of 20° C. to 30° C.

The battery modules 2 are electrically connected to one another by means of a plurality of busbars 5 extending in the longitudinal direction X. The battery system 1 comprises a busbar housing 6, wherein the busbars 5 are arranged in the busbar housing 6. In the present case, the busbar housing 6 is linearly configured and extends in the longitudinal vehicle direction X, spanning a plurality of battery modules 2 arranged in succession in the longitudinal vehicle direction X, as shown by way of example in FIG. 5. The busbar housing 6 is configured as a separate housing and therefore is not part of the module housing 3. Furthermore, no separate battery housing is provided. The busbar housing 6 extends outside the module housing 3 and is arranged above the module housing 3 in the vertical vehicle direction Z.

For the purpose of cooling the busbars 5, the busbars 5 are thermally coupled to the busbar housing 6, wherein the busbar housing 6 is, in turn, thermally coupled to the module housing 3. The busbars 5 are cooled indirectly via the cooling system of the battery cells 4 by means of the thermal coupling between the busbar housing 6 and the busbars 5 and the thermal coupling between the busbar housing 6 and the module housing 3, because the module housing 3 is cooled directly or indirectly via the cooling system. Due to the fairly long cooling path across the housings 3, 6, the busbars 5 are not cooled as strongly as the battery cells, and a reasonable temperature level for the busbars 5, which is significantly above the temperature level of the battery cells 3, is achieved despite use of the same cooling system.

In the present case, the busbar housing 6 comprises a lower shell 8 connected to the module housing 3 of the respective battery module 2 and an upper shell 7 releasably connected to the lower shell 8. In the present case, the lower shell 8 is screwed to the upper shell 7 via connecting screws 10. The lower shell 8 is preferably configured as a casted part and has a greater material thickness than the upper shell 7, which in the present case is configured as a bent sheet metal part. In the embodiment according to FIG. 1, the lower shell 8 directly and completely abuts the rectangular extrusion profile of the module housing 3.

For the purpose of thermal coupling of the busbars 5 to the busbar housing 6, thermally conductive heat conducting elements 9 are introduced in the form of gap pads between the busbars 5 and the upper shell 7 as well as the lower shell 8. The gap pads 9 do not directly contact the busbars 5, but rather contact an electrical insulation 11, which enclose the actual busbars 5.

In the present case, the lower shell 8 directly contacts an upper wall of the module housing 3 and both the lower shell 8 and the module housing 3 are made of a material with good thermal conductivity, so that a corresponding thermal coupling is achieved.

Figure 2:
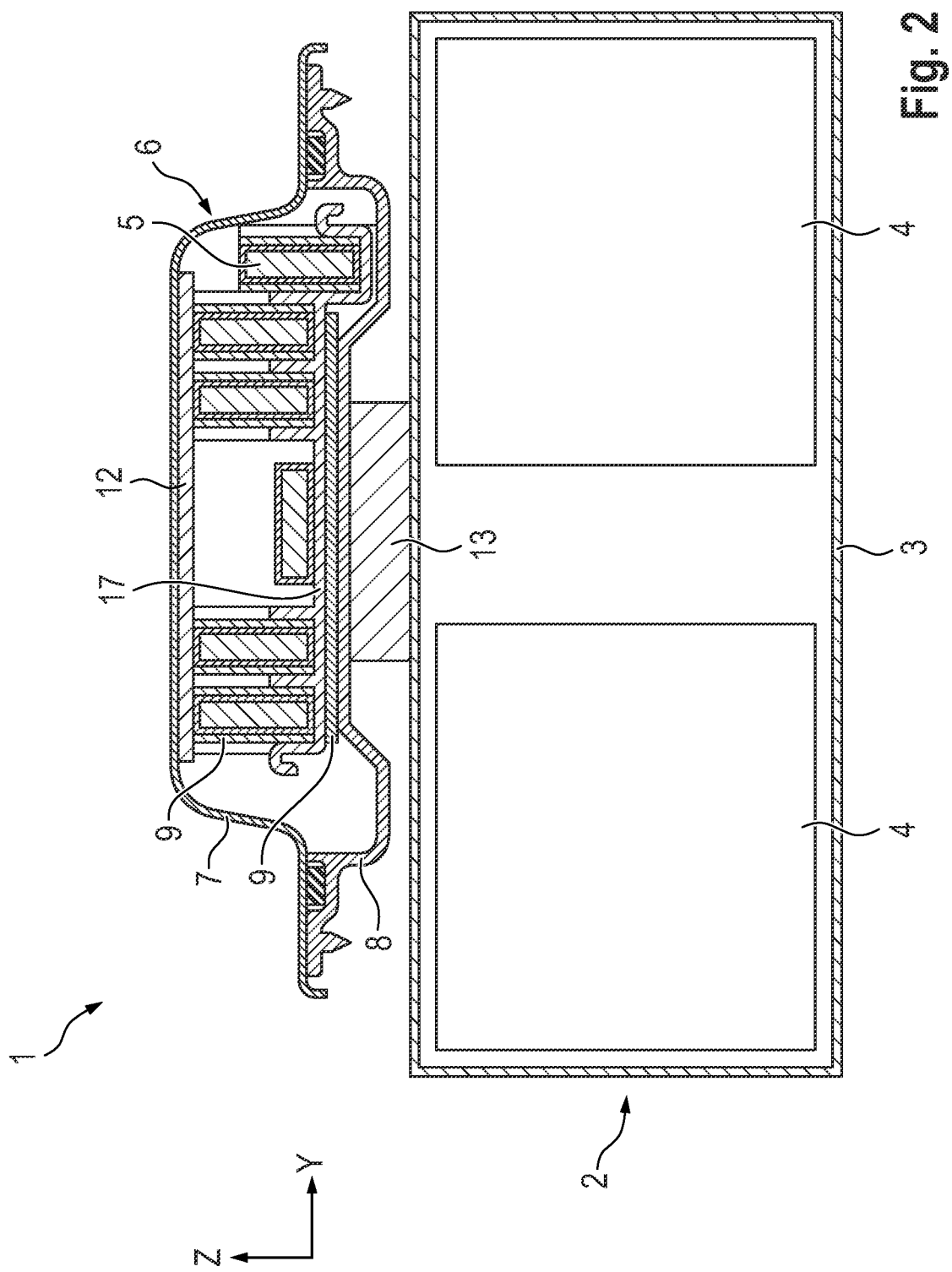
FIG. 2 depicts a second embodiment of the battery system in a sectional view.

The embodiment shown in FIG. 2 is different from the embodiment shown in FIG. 1. By contrast to the embodiment according to FIG. 1, the lower shell 8 is thermally connected to the module housing 3 of the respective battery module 2 merely locally and, in this respect, not over its entire longitudinal extension. More specifically, the respective battery module housing 3 comprises a connecting portion 13, which projects on a side of the module housing 3 facing the busbar housing 6, in the present case in the Z direction. Preferably, the connecting portion 13 is also used in order to mechanically secure the busbar housing 6 to the module housing 3. Accordingly, the connecting portion 13 serves for both the mechanical and thermal connection of the busbar housing 6 to the module housing 3. For this purpose, the connecting portion 13 can comprise one or more threads for screwing in a connecting screw that passes through the lower shell 8.

In the embodiment according to FIG. 2, the module housing 3 comprises a terminal opening 16 (not shown in further detail in FIG. 2) for establishing an electrical connection to the respective busbar 5, wherein a terminal element 17 passes through the terminal opening 16, wherein the connecting portion 13 circumferentially encloses the terminal opening 16 and the busbar housing 6 sealingly cooperates with the connecting portion 13. In such an embodiment, the connecting portion 13 is preferably annular in configuration. Such an embodiment is shown schematically in FIGS. 5 and 6, wherein the busbar housing 6 is not shown in FIG. 6 for reasons of clarity.

Furthermore, in the embodiment according to FIG. 2, it is provided that the busbars 5 in the busbar housing 6 are mechanically held in a bearing structure 17, wherein this bearing structure 17 serves to pre-secure the busbars 5 for ease of assembly. The bearing structure 17 consists of a thermally conductive plastic and is thermally coupled to the lower shell 8 of the busbar housing 6, wherein, in turn, the thermal coupling in the present case takes place via a gap pad 9. The bearing structure 17 comprises a separate retaining portion for each busbar 5, which, in the present case, is filled with heat conducting elements 9 that circumferentially enclose the respective busbar 5.

In the embodiment according to FIG. 2, a spring element 12 is arranged above the busbars 5, wherein the spring element 12 serves to compensate for manufacturing tolerances and is ensure that no air gap can arise between the busbars 5 and the gap pad 9 as well as the gap pad 9 and the lower shell 8 of the busbar housing 6, in that the spring element 12 presses the busbars 5 in the direction of the lower shell 8.

Figure 3:
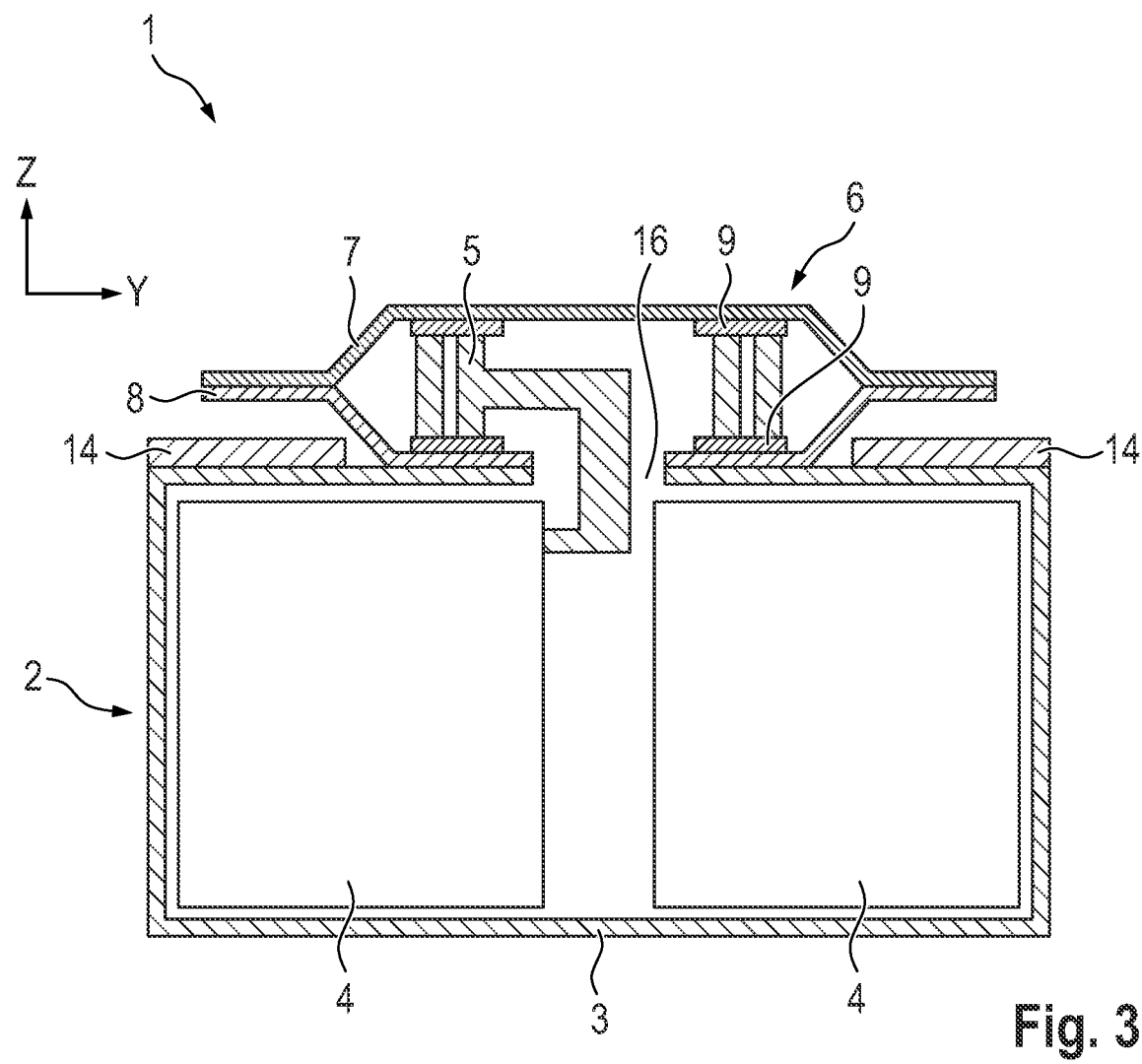
FIG. 3 depicts a third embodiment of the battery system in a sectional view.

In the embodiment shown in FIG. 3, it is provided that a heat sink 14 in the form of a heat sink plate is mounted on an outer side of the module housing 3 facing away from the battery cells 4, wherein this heat sink plate comprises a plurality of cooling ducts that are perfusable with a coolant of the cooling circuit. The busbar housing 6 is mounted on this outer side of the battery module housing 3 comprising the heat sink plate, wherein the lower shell 8 of the busbar housing 6 directly contacts the module housing 3 and not, for example, the heat sink plate 14. Accordingly, the busbar housing 6 and the heat sink 14 of the cooling system are thermally coupled to one another merely indirectly via the housing wall of the module housing 3.

Figure 4:
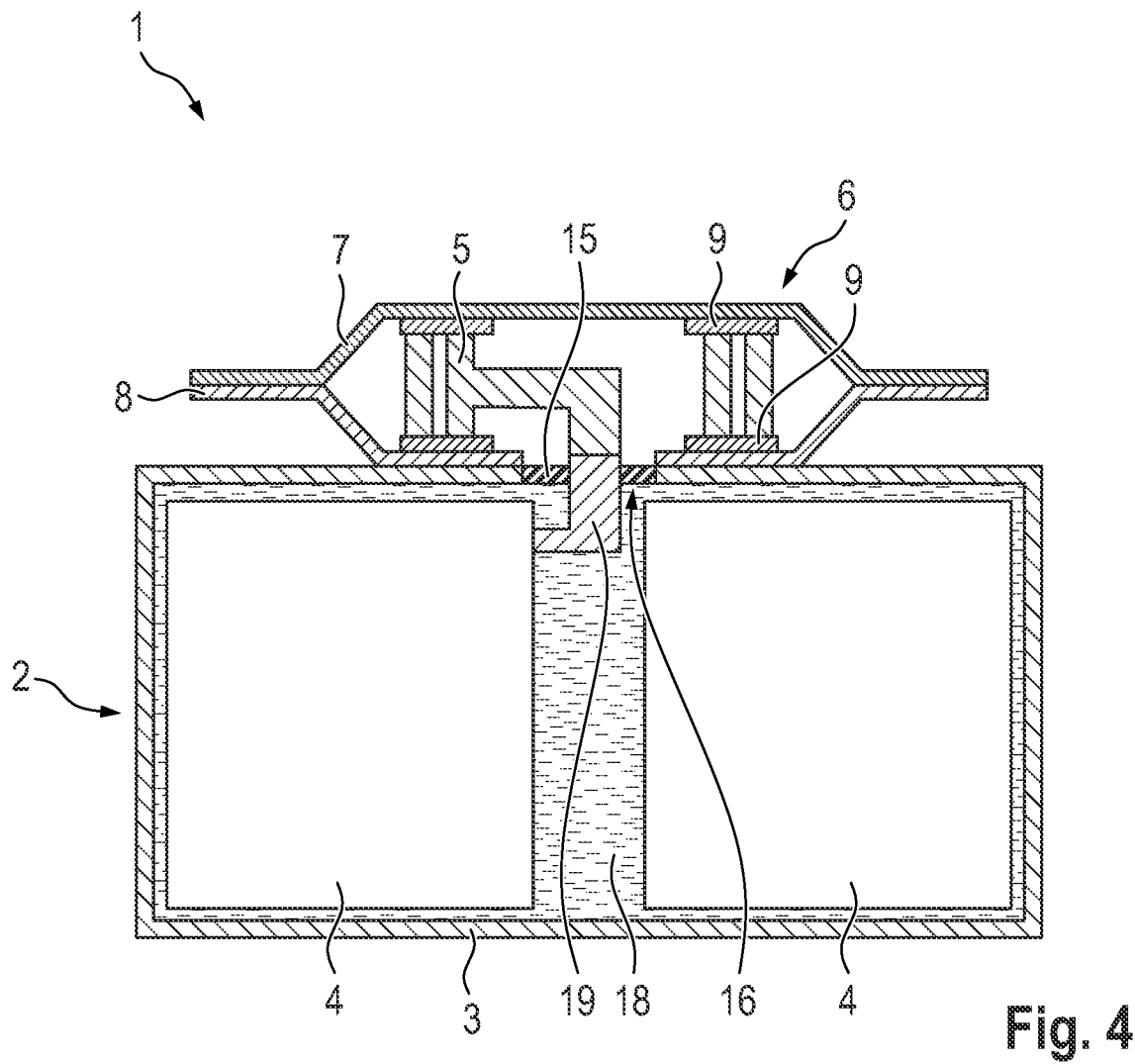
FIG. 4 depicts a fourth embodiment of the battery system in a sectional view.
Figure 5:
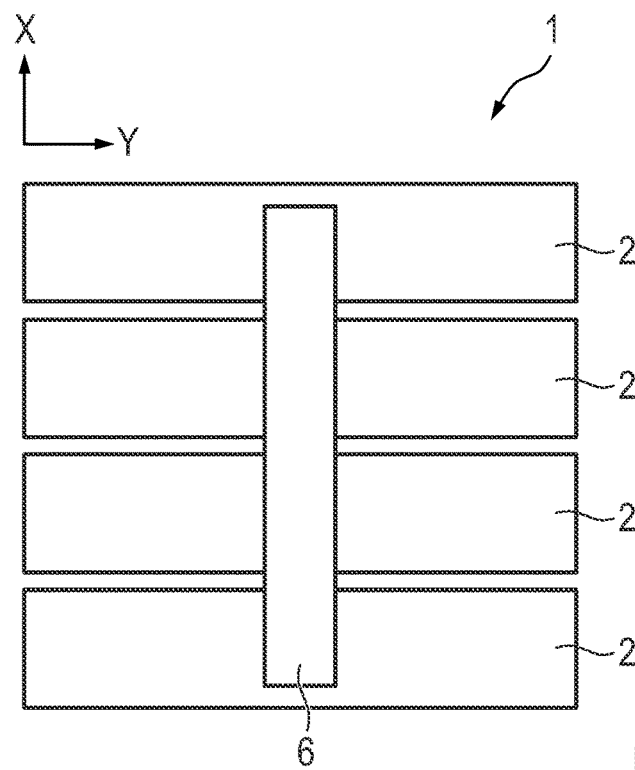
FIG. 5 depicts a further embodiment of the battery system in a top-down view.
Figure 6:
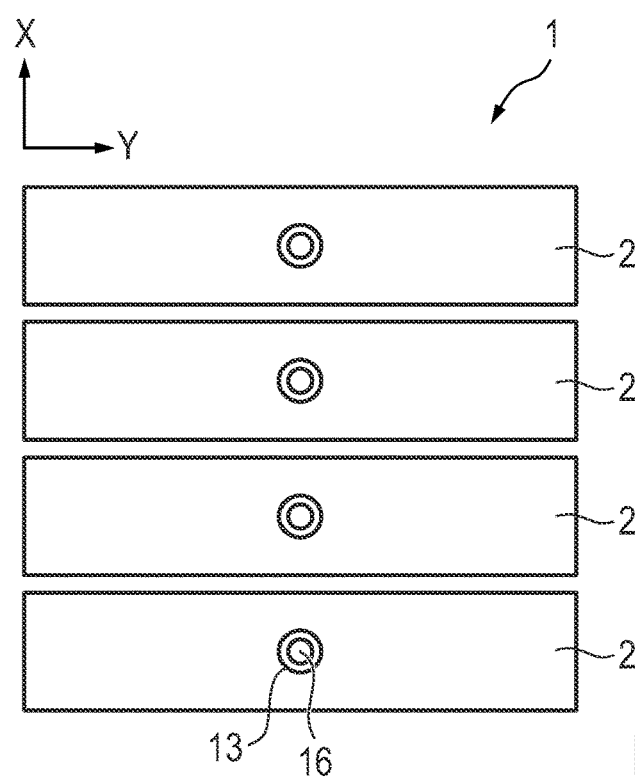
FIG. 6 depicts the embodiment according to FIG. 5 without a busbar housing in a top-down view.

In the embodiment shown in FIG. 4, the cooling of the battery cells 4 is not carried out via heat sinks 14 mounted on the module housing 3; rather, the internal space of the battery module 2 enclosed by the module housing 3, which receives the battery cells 4, is directly flooded with a dielectric cooling fluid 18 of the cooling circuit. The terminal opening 16 is tightly sealed with a sealing body 15, wherein a connecting element 19, which can be connected to the respective busbar 5, passes through the sealing body 15.

LIST OF REFERENCE NUMERALS

1 Battery system
2 Battery module
3 Module housing
4 Battery cell
5 Busbar
6 Busbar housing
7 Upper shell
8 Lower shell
9 Heat conducting element
10 Screw
11 Electrical insulation
12 Spring element
13 Connecting portion
14 Heat sink plate
15 Sealing body
16 Terminal opening
17 Bearing structure
18 Dielectric cooling fluid
19 Terminal element

What is claimed is:

1. A battery system for an electrically or semi-electrically driven vehicle, said battery system comprising:
   at least two battery modules, each having a module housing and a plurality of battery cells arranged in the module housing,
   a cooling system for cooling the battery cells,
   a busbar connecting the at least two battery modules,
   a busbar housing positioned outside of the module housings, wherein the busbar is arranged within the busbar housing and is thermally coupled to the busbar housing,
   electrical insulation disposed at least partially about a perimeter of the busbar,
   a first deformable heat conducting element positioned between (i) the electrical insulation on a first side of the busbar and (ii) a first surface of the busbar housing for transferring heat from the busbar to the first surface of the busbar housing, and
   a second deformable heat conducting element positioned between (i) the electrical insulation on a second side of the busbar that is opposite the first side and (ii) a second surface of the busbar housing that is opposite the first surface for transferring heat from the busbar to the second surface of the busbar housing,
   wherein the busbar housing is thermally coupled, at least in portions, to at least one of the battery modules.

2. The battery system according to claim 1, wherein the busbar housing is thermally coupled, at least in portions, to the module housing of both battery modules.

3. The battery system according to claim 1, wherein a plurality of busbars are arranged in the busbar housing.

4. The battery system according to claim 1, wherein the busbar housing comprises a lower shell and an upper shell, which are releasably connected to one another.

5. The battery system according to claim 1, wherein the first deformable heat conducting element and the second deformable heat conducting element are in the form of either a gap pad or a gap filler.

6. The battery system according to claim 1, wherein a plurality of busbars are arranged in the busbar housing, and the busbars in the busbar housing are mechanically held in a bearing structure, wherein the bearing structure is thermally coupled to the busbar housing.

7. The battery system according to claim 1, wherein the module housing of said one of the battery modules comprises a connecting portion that projects outwardly on an outside of a housing wall of the module housing, wherein the busbar housing is mechanically connected to the module housing of said one of the battery modules in a region of the connecting portion.

8. The battery system according to claim 1, wherein the cooling system comprises a heat sink mounted on an outer side of the module housing of said one of the battery modules facing away from the battery cells, the heat sink being perfusable by a coolant, wherein the busbar housing and the heat sink are thermally coupled to one another only indirectly via a wall of one of the module housing of said one of the battery modules.

9. The battery system according to claim 1, wherein the module housing of said one of the battery modules comprises (i) a terminal opening for establishing an electrical connection with the busbar, wherein a terminal element passes through the terminal opening, and (ii) a sealing portion circumferentially enclosing the terminal opening, wherein the busbar housing sealingly cooperates with the circumferentially enclosing sealing portion.

10. The battery system according to claim 1, wherein the busbar housing is thermally coupled, at least in portions, to the module housing of said one of the battery modules.

11. The battery system according to claim 1, wherein the busbar housing is thermally coupled, at least in portions, to the module housing of all of the battery modules.

12. A motor vehicle comprising the battery system of claim 1.

13. The motor vehicle of claim 12, wherein the motor vehicle is a passenger car.

14. The battery system according to claim 1, wherein the first and second surfaces of the busbar housing are respective surfaces of a two-part housing of the busbar housing.

15. The battery system according to claim 1 further comprising a second busbar, wherein the first and second deformable heat conducting elements each comprise a stepped body, wherein said busbar is positioned on first steps of the respective first and second deformable heat conducting elements and the second busbar is positioned on second steps of the respective first and second deformable heat conducting elements.

16. The battery system according to claim 1, wherein the first and second deformable heat conducting elements each comprise an elastically deformable gap pad.

17. The battery system according to claim 1, wherein the module housing of said one of the battery modules has a module housing opening and the busbar housing includes a busbar housing opening that registers with the module housing opening, and wherein the busbar includes a terminal element that extends through the busbar housing opening and the module housing opening to connect to one of the battery cells within the module housing of said one of the battery modules.

18. The battery system according to claim 17, wherein a sealing body is disposed at the module housing opening and the terminal element of the busbar also extends through the sealing body.

19. The battery system according to claim 18 further comprising dielectric cooling fluid disposed within the module housing of said one of the battery modules, wherein the sealing body either limits or prevents escapement of the dielectric cooling fluid through the module housing opening of the module housing.

* * * * *